US010203755B2

(12) United States Patent
Aono

(10) Patent No.: US 10,203,755 B2
(45) Date of Patent: Feb. 12, 2019

(54) INPUT APPARATUS AND CONTROL METHOD FOR INPUT APPARATUS

(75) Inventor: Tomotake Aono, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 312 days.

(21) Appl. No.: 13/392,867

(22) PCT Filed: Aug. 26, 2010

(86) PCT No.: PCT/JP2010/005277
§ 371 (c)(1),
(2), (4) Date: Feb. 27, 2012

(87) PCT Pub. No.: WO2011/024462
PCT Pub. Date: Mar. 3, 2011

(65) Prior Publication Data
US 2012/0154317 A1    Jun. 21, 2012

(30) Foreign Application Priority Data

Aug. 27, 2009   (JP) .................................. 2009-197132

(51) Int. Cl.
| G06F 3/045 | (2006.01) |
| G06F 3/041 | (2006.01) |
| G06F 3/01  | (2006.01) |

(52) U.S. Cl.
CPC .............. *G06F 3/016* (2013.01); *G06F 3/041* (2013.01); *G06F 2203/04105* (2013.01)

(58) Field of Classification Search
CPC ........ G06F 3/016; G06F 3/0414; G06F 3/041; G06F 3/0488; G06F 3/0416
See application file for complete search history.

(56) References Cited

U.S. PATENT DOCUMENTS

| 2005/0012723 A1* | 1/2005 | Pallakoff ............... G06F 1/1616 |
| | | 345/173 |
| 2005/0057527 A1* | 3/2005 | Takenaka .............. G06F 3/0414 |
| | | 345/173 |
| 2006/0052143 A9 | 3/2006 | Tuovinen |
| (Continued) | | |

FOREIGN PATENT DOCUMENTS

| CN | 1821935 A  | 8/2006 |
| CN | 101118469 A | 2/2008 |
| (Continued) | | |

OTHER PUBLICATIONS

The Japanese Office Action "Notification of Reason for Refusal" dated Feb. 5, 2013, which corresponds to Japanese Patent Application No. 2011-143062, and is related to U.S. Appl. No. 13/392,867 with translation.

(Continued)

*Primary Examiner* — Nan-Ying Yang
(74) *Attorney, Agent, or Firm* — Studebaker & Brackett PC

(57) ABSTRACT

An input apparatus has a touch sensor 11 configured to detect a touch input, a piezoelectric element 12 mounted on the touch sensor 11, and a control unit 15 configured to detect a pressure load on a touch face 11*a* of the touch sensor 11 based on an output signal of the piezoelectric element 12 and, when the pressure load detected satisfies a standard to provide a tactile sensation, to drive the piezoelectric element 12 such that the tactile sensation is provided to an object pressing the touch face 11*a*.

12 Claims, 3 Drawing Sheets

(56) References Cited

U.S. PATENT DOCUMENTS

| | | | |
|---|---|---|---|
| 2006/0119586 A1* | 6/2006 | Grant | G06F 3/016 345/173 |
| 2006/0192657 A1* | 8/2006 | Nishimura et al. | 340/407.2 |
| 2008/0024459 A1 | 1/2008 | Poupyrev et al. | |
| 2009/0267902 A1 | 10/2009 | Nambu et al. | |

FOREIGN PATENT DOCUMENTS

| | | | | |
|---|---|---|---|---|
| CN | 101268435 A | | 9/2008 | |
| JP | 11-212725 A | | 8/1999 | |
| JP | 11212725 A | * | 8/1999 | G06F 3/033 |
| JP | 2003-288158 A | | 10/2003 | |
| JP | 2006-048302 A | | 2/2006 | |
| JP | 2006-107140 A | | 4/2006 | |
| JP | 2006-227712 A | | 8/2006 | |
| JP | 2007-086990 A | | 4/2007 | |
| JP | 2008-130055 A | | 6/2008 | |
| KR | 10-2008-0109109 A | | 12/2008 | |

OTHER PUBLICATIONS

An Office Action issued by the Korean Intellectual Property Office dated May 28, 2013, which corresponds to Korean Patent Application No. 10-2012-7005089, and is related to U.S. Appl. No. 13/392,867, with translation.
Japanese Office Action "Appeal Decision of Refusal" dated Oct. 16, 2012, which corresponds to Japanese Patent Application No. 2009-197132 and is related to U.S. Appl. No. 13/392,867 with translation.
Y.Morikawa; Notice of Reasons for Rejection; Japanese Office Action; Japanese Patent Application No. 2009-197132 with translation; drafting date Dec. 21, 2009.
A. Toyoda; Notice of Reasons for Rejection; Japanese Office Action; Japanese Patent Application No. 2009-197132 with translation; drafting date May 6, 2010.
A. Toyoda; Notice of Reasons for Rejection; Japanese Office Action; Japanese Patent Application No. 2009-197132 with translation; drafting date Oct. 19, 2010.
A. Toyoda; Official Decision of Refusal of Amendments; Japanese Office Action; Japanese Patent Application No. 2009-197132 with translation; drafting date Apr. 1, 2011.
A. Toyoda; Official Decision of Refusal; Japanese Office Action; Japanese Patent Application No. 2009-197132 with translation; drafting date Apr. 1, 2011.
S. Mizuno; Interrogation; Japanese Office Action; Japanese Patent Application No. 2009-197132 with translation; drafting date Jan. 27, 2012.
S.Mizuno; Japanes Office Action; Japanese Patent Application No. 2009-197132.
International Search Report; PCT/JP2010/005277; dated Nov. 22, 2010.
"Notification of the First Office Action" issued by the State Intellectual Property Office of China dated Jan. 26, 2014, which corresponds to Chinese Patent Application No. 2010800381323 and is related to U.S. Appl. No. 13/392,867; with English language translation.
An Office Action issued by the Korean Patent Office dated Dec. 24, 2013, which corresponds to Korean Patent Application No. 10-2012-7005089 and is related to U.S. Appl. No. 13/392,867; with English language statement of relevance.
An Office Action; "Decision of Rejection," issued by the Japanese Patent Office dated Nov. 26, 2013, which corresponds to Japanese Patent Application No. 2011-143062 and is related to U.S. Appl. No. 13/392,867; with English language concise explanation.
The second Office Action issued by the State Intellectual Property Office of China dated Sep. 15, 2014, which corresponds to Chinese Patent Application No. 201080038132.3 and is related to U.S. Appl. No. 13/392,867; with English language translation.
An Office Action issued by the Korean Patent Office dated Jun. 25, 2014, which corresponds to Korean Patent Application No. 10-2012-7005089 and is related to U.S. Appl. No. 13/392,867; with English language statement of relevance.

* cited by examiner (a)

(b)

INPUT APPARATUS AND CONTROL METHOD FOR INPUT APPARATUS

CROSS REFERENCE TO RELATED APPLICATION

This application claims priority to and the benefit of Japanese Patent Application No. 2009-197132 filed on Aug. 27, 2009, the entire contents of which are incorporated herein by reference.

TECHNICAL FIELD

The present invention relates to an input apparatus having a touch sensor and a control method for an input apparatus.

BACKGROUND ART

In recent years, input apparatus such as operation units, switches and the like having touch sensors such as touch panels, touch switches and the like to receive input operations by users have been widely used for mobile terminals such as mobile phones, information equipment such as calculators and ticket vending machines, home electric appliances such as microwaves, TV sets and lighting equipment, industrial equipment (FA equipment) and the like.

There are known a variety of types of those touch sensors, such as a resistive film type, a capacitive type, an optical type and the like. However, touch sensors of these types receive a touch input by a finger or a stylus pen and, unlike push-button switches, the touch sensors themselves are not physically displaced even when being touched.

Since the touch sensors themselves are not physically displaced when touched, an operator cannot obtain feedback to an input even though the touch input is received. As a result, the operator is likely to input erroneously by touching the same spot multiple times, which may be stressful for the operator.

As methods to prevent such erroneous inputs, there are known methods allowing to visually or aurally confirm the input operation upon reception of the touch input by, for example, generating sounds or changing a display state such as color of input object of input button and the like graphically depicted on a display unit.

However, such auditory feedback may be difficult to be confirmed in a noisy environment and is not applicable when the equipment being used is in a silent mode. In addition, in using such visual feedback, when the operator is inputting by the finger, if the input object displayed on the display unit is small, the operator may not be able to confirm the change in the display state, as a view of the input object is blocked by the finger.

There is also suggested a feedback method relying on neither the auditory—nor visual sensation but instead generating a tactile sensation at operator's fingertip by vibrating the touch sensor when the touch sensor receives an input (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

The techniques disclosed in the above Patent Documents 1 and 2, however, merely vibrate the touch sensor when the touch sensor receives an input. Therefore, in using the input apparatus having the button switch such as a mechanical push-button switch (push-type button switch) graphically depicted on the touch sensor having a low threshold to receive the input, a tactile sensation is provided when the finger or the like lightly contacts (touches) the touch sensor. It may trigger erroneous operations by responding to an unintentional motion (touch) before the operator pushes the touch sensor and bring a feeling of strangeness to the operator upon such an unintentional motion (touch). Here, the threshold for the touch sensor to receive a touch input is a threshold at which the touch sensor responds. For example, for a touch sensor of the resistive film type, the threshold is a threshold of a pressure at which an upper conductive film is contacted to a lower conductive film and, for a touch sensor of the capacitive type, the threshold is a threshold for detection of an electric signal by contact.

In order to clear such a disadvantage, the applicant has developed an input apparatus which detects the pressure load of touch to the touch face of the touch sensor and, when the detected load reaches a predetermined threshold to provide the tactile sensation, vibrates the touch face of the touch sensor such that the tactile sensation is provided to a pressing object such as the finger and the like.

According to this input apparatus, since the tactile sensation is provided when the operator pushes the touch face and the pressure load reaches the predetermined threshold, it is possible to allow the operator to perceive reception of an input while reliably preventing erroneous operations triggered by the unintentional touch described above and the feeling of strangeness.

Incidentally, the input apparatus needs a load sensor to detect the pressure load on the touch sensor and an actuator to vibrate the touch sensor in addition to basic components such as the touch sensor and a control unit. This leads to increase in the number of components and cost as well as a size of the apparatus to retain necessary space for the components. Therefore, there is room for improvement in implementation of the input apparatus described above, in terms of the cost and downsizing of the input apparatus.

An object of the present invention, in consideration of such issues, is to provide an input apparatus and a control method of the input apparatus appropriately configured to enable cost reduction and downsizing.

Solution to Problem

In order to achieve the above object, an input apparatus according to a first aspect of the present invention includes:
a touch sensor configured to detect a touch input;
a piezoelectric element mounted on the touch sensor; and
a control unit configured to detect a pressure load on a touch face of the touch sensor based on an output signal of the piezoelectric element and, when the pressure load detected satisfies a standard to provide a tactile sensation, to drive the piezoelectric element such that the tactile sensation is provided to an object pressing the touch face.

A second aspect of the present invention is the input apparatus according to the first aspect, wherein the piezoelectric element has one end mounted on the touch sensor and the other end opened.

Moreover, in order to achieve the above object, a control method of an input apparatus according to a third aspect of the present invention including a touch sensor configured to detect a touch input and a piezoelectric element having one end mounted on the touch sensor and the other end opened, includes the step of: detecting a pressure load on a touch face of the touch sensor based on an output signal of the piezoelectric element and, when the pressure load detected satisfies a standard to provide a tactile sensation, driving the piezoelectric element such that the tactile sensation is provided to an object pressing the touch face.

Effect of the Invention

The input apparatus according to the present invention, utilizing direct piezoelectric effect and converse piezoelectric effect of the piezoelectric element, uses the piezoelectric element as a load sensor to detect the pressure load on the touch face of the touch sensor and as an actuator to vibrate the touch face, thereby sharing one component for a plurality of functions. It is thus possible to reduce the number of components and the cost as well as to save space for the components achieving downsizing of the apparatus.

DESCRIPTION OF EMBODIMENT

An embodiment of the present invention will be described with reference to the accompanying drawings.

Figure 1:
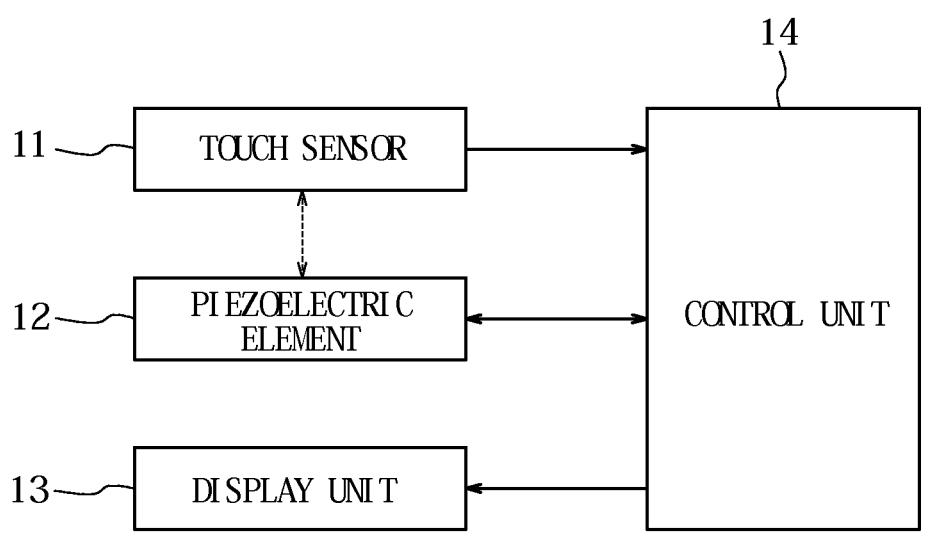
FIG. 1 is a functional block diagram illustrating a schematic configuration of an input apparatus according to one embodiment of the present invention.

FIG. 1 is a functional block diagram illustrating a schematic configuration of an input apparatus according to one embodiment of the present invention. The input apparatus has a touch sensor 11, a piezoelectric element 12, a display unit 13, and a control unit 14 to control an operation of each unit.

Under control of the control unit 14, the touch sensor 11 detects a touch input to a touch face of the touch sensor 11 by a pressing object, such as a finger and the like, and provides the control unit 14 with position information of a touch position. The touch sensor 11 may be of a known type, such as a resistive film type, a capacitive type, an optical type and the like, and disposed on the display unit 13.

The piezoelectric element 12 is mounted on the touch sensor 11. Under control of the control unit 14, the piezoelectric element 12 is activated in one of a load detection mode to detect the pressure load on the touch face of the touch sensor 11 by utilizing direct piezoelectric effect or a tactile sensation providing mode to vibrate the touch face of the touch sensor 11 by utilizing converse piezoelectric effect. In the load detection mode, the piezoelectric element 12 supplies the control unit 14 with an output signal corresponding to the pressure load on the touch face of the touch sensor 11. In the tactile sensation providing mode, the piezoelectric element 12 vibrates the touch face of the touch sensor 11 based on a drive signal supplied from the control unit 14 such that a predetermined tactile sensation corresponding to the drive signal is provided to the pressing object pressing the touch face.

Under control of the control unit 14, the display unit 13 displays an input object of an input button and the like such as a push-button switch (push-type button switch) and may be constituted by using, for example, a liquid crystal display panel, an organic EL display panel and the like. The touch input to the input object displayed on the display unit 13 is detected by the control unit 14 based on the position information output from the touch sensor 11.

The control unit 14 may be, for example, a CPU and the like and controls the operation of each unit based on the position information from the touch sensor 11, display information for the display unit 13, the output signal corresponding to the pressure load obtained from the piezoelectric element 12 in the load detection mode, and the like.

Figure 2:
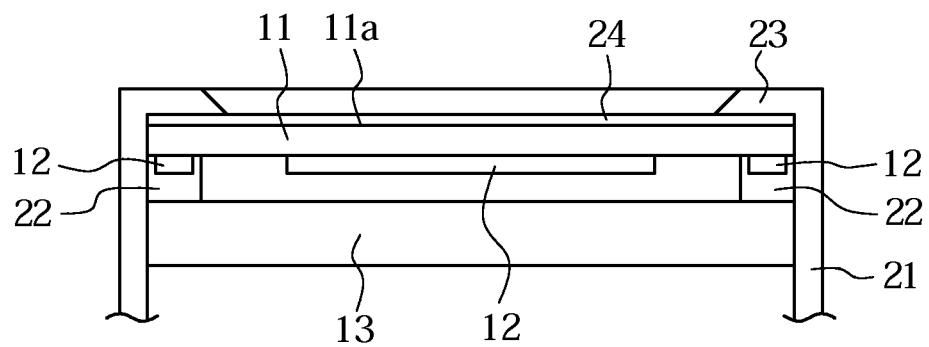
FIG. 2 illustrates a cross-sectional view of a main section and a plane view of the main section that illustrate an exemplary housing structure of a touch sensor, piezoelectric elements and a display unit illustrated in FIG. 1.
Figure 2:
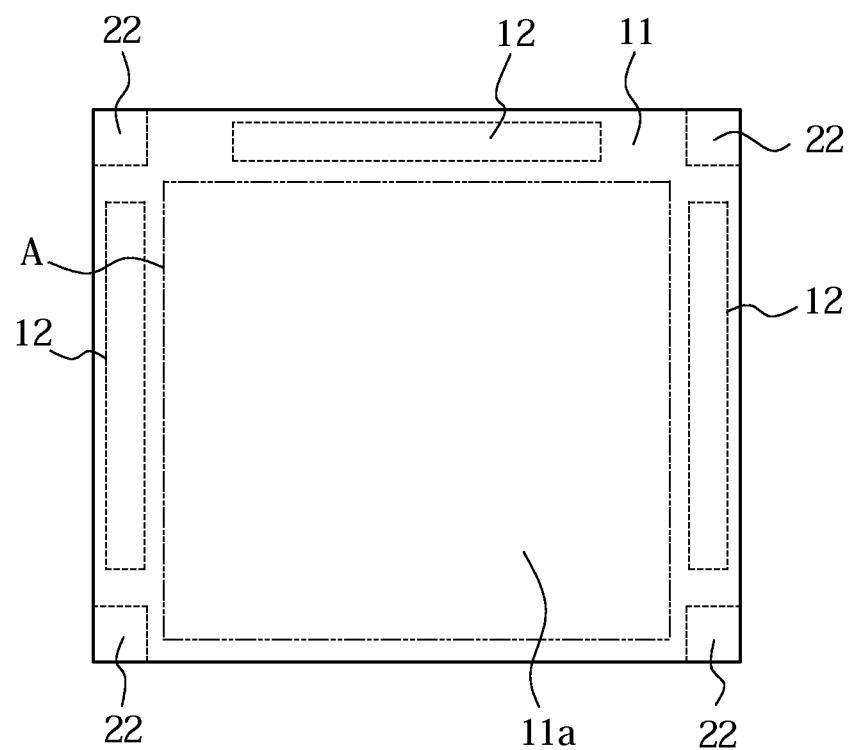

FIG. 2 illustrates an exemplary housing structure of the touch sensor 11, the piezoelectric elements 12 and the display unit 13 illustrated in FIG. 1; FIG. 2(a) is a cross-sectional view of a main section, and FIG. 2(b) is a plane view of the main section. The display unit 13 is contained in a housing 21. The touch sensor 11 is disposed on the display unit 13 via insulators 22 made of elastic members. According to the present embodiment, the touch sensor 11 is disposed on the display unit 13 via the insulators 22 arranged at four corners outside a display area A of the display unit 13 illustrated by a chain double-dashed line in FIG. 2(b).

The housing 21 is provided with an upper cover 23 covering a surface area of the touch sensor 11 outside the display area of the display unit 13. An insulator 24 for dust-proof made of elastic member is arranged between the upper cover 23 and the touch sensor 11.

The touch sensor 11 illustrated in FIG. 2 may have, for example, a surface member having a touch face 11a and made of a transparent film or the glass, and a rear face member made of the glass or acryl. The touch sensor 11 is designed such that, when the touch face 11a is pressed down via the insulator 24, a pushed part is slightly bent (strained) in accordance with pressure and thereby an entire touch sensor 11 including the rear face member is slightly bent.

Each piezoelectric element 12 is provided on the rear face of the touch sensor 11 at a position covered by the upper cover 23 and close to one or a plurality of peripheries, here it is three peripheries. These three piezoelectric elements 12 are connected to the control unit 14 in parallel. Each of the piezoelectric elements 12 detects the pressure load on the touch face 11a of the touch sensor 11 and vibrates the touch sensor 11 such that the tactile sensation is provided to the pressing object pressing the touch face 11a. It is to be noted that the housing 21, the upper cover 23 and the insulator 24 illustrated in FIG. 2(a) are omitted in FIG. 2(b).

Figure 3:
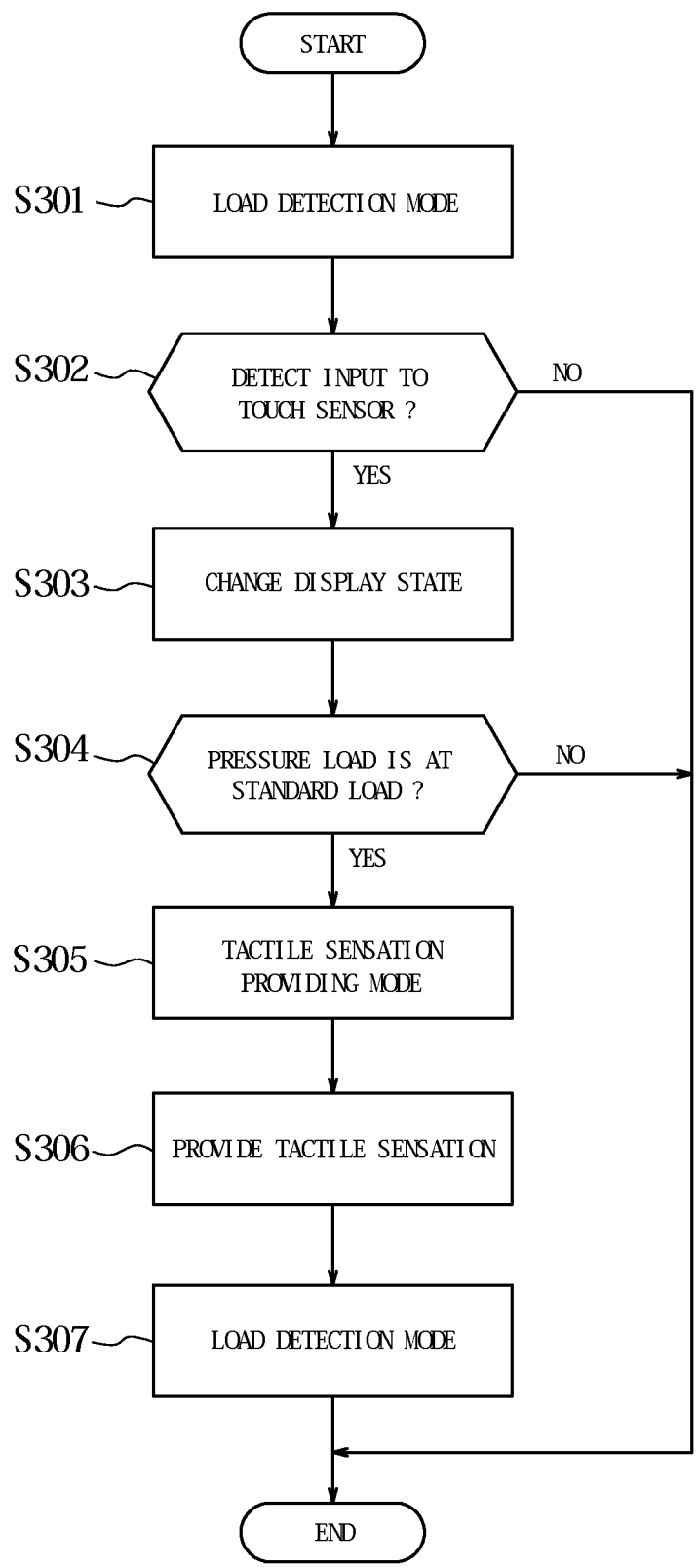
FIG. 3 is a flowchart illustrating a schematic operation of the input apparatus illustrated in FIG. 1.

FIG. 3 is a flowchart of a schematic operation of the input apparatus according to the present embodiment. The control unit 14 sets the three piezoelectric elements 12 in the load detection mode constantly and monitors the output signals of them (step S301). In addition, the control unit 14 monitors output of the touch sensor 11 and detects whether the position information of the touch input by the pressing object (pressing means) such as the finger and the like obtained from the touch sensor 11 indicates an input to a position corresponding to the input object displayed on the display unit 13 (step S302). As a result, when the position information from the touch sensor 11 indicates that it is an input to a position corresponding to the input object displayed on the display unit 13 (in case of "Yes"), a display state, such as color and the like, of the input object on the display unit 13 is changed (step S303).

Moreover, the control unit 14 calculates the pressure load on the touch sensor 11 based on the output of the three piezoelectric elements 12 and determines whether the pressure load satisfies a standard (for example, 1 N) to provide the tactile sensation (step S304). As a result, when detecting that the pressure load satisfies the standard (in case of "Yes"), the control unit 14 switches the three piezoelectric elements 12 from the load detection mode to the tactile sensation providing mode (step S305). Subsequently, the control unit 14 drives the three piezoelectric elements 12 by supplying (applying) them with respective predetermined drive signals. Thereby, the touch sensor 11 is vibrated and provides the tactile sensation to the pressing object touching the touch face 11a (step S306). Then, the control unit 14 switches the three piezoelectric elements 12 back to the load detection mode (step S307) and calculates the pressure load on the touch sensor 11.

Preferably, at step S304, the pressure load is calculated based on the output of the three piezoelectric elements 12, such that approximately the same calculation result is obtained when an operator feels nearly the same pressure sensation (hard feeling, soft feeling and the like) at each position on the touch face 11a. Accordingly, the control unit 14 calculates the pressure load based on, for example, an average value of the output of the three piezoelectric elements, a weighted additional value and the like. Similarly, at the step S306, such the drive signals are applied to the respective three piezoelectric elements 12 that the operator preferably obtains nearly the same pressure sensation and nearly the same touch sensation (feeling of texture and the like) at each position on the touch face 11a. Therefore, the control unit 14 appropriately changes amplitude, a phase and the like in accordance with a position and a location on the touch face 11a such that an approximately the same tactile sensation in combination of the pressure sensation and the touch sensation is provided.

At step S304, in addition, the standard of the pressure load to provide the tactile sensation may be appropriately set in accordance with a load characteristic of an intended push-button switch in pressing. For example, the standard may be set to be equal to a load at which the touch sensor 11 responds to the touch input (synchronizing a timing to provide the tactile sensation with a timing of response to the touch input by the touch sensor 11) or to be higher than the load at which the touch sensor 11 responds to the touch input (setting the timing to provide the tactile sensation later than the timing of response to the touch input by the touch sensor 11). For example, when the input apparatus according to the present embodiment is applied to a mobile terminal, it is preferable to set the standard equal to or higher than the load at which the touch sensor 11 responds to the touch input (setting the timing to provide the tactile sensation later than the timing of response to the touch input by the touch sensor 11). Preferably, the standard is set by users as desired such that an elder user may set it heavier (slower) and a user who often writes messages may set it lighter (quicker).

In addition, the tactile sensation provided at step S306 may be appropriately set based on the drive signal applied to the piezoelectric elements 12. For example, in order to provide a click sensation "Cli", which is obtained when a push-button switch employed by the mobile terminal is pressed, the control unit 14 drives the piezoelectric elements 12 as follows. That is, upon application of the pressure load satisfying the standard set forth above, the drive signal, for example, a sine wave with a constant frequency of, for example, 100 Hz to 200 Hz, preferably 170 Hz, for 1 period is applied to the piezoelectric elements 12 such that the touch face 11a is vibrated by approximately 15 µm while the pressure load satisfying the standard is applied thereto. Thereby, it is possible to allow the operator to recognize that an input operation is completed, by providing a realistic click sensation to the operator through the pressing object (pressing means) pressing the touch face 11a of the touch sensor 11. Similarly, in order to provide another click sensation "Click", which feels harder than the click sensation "Cli", the control unit 14 applies the drive signal, for example, a sine wave or a square wave with a frequency of, for example, approximately 200 Hz to 500 Hz, for 1 period to the piezoelectric elements 12.

As described above, the control unit 14 does not drive the piezoelectric elements 12 until the load applied to the touch sensor 11 calculated based on the output of the piezoelectric elements 12 satisfies the standard to provide the tactile sensation (for example, 1 N). Thereby, a tactile sense of the operator is stimulated. Then, when the load detected satisfies the standard, the control unit 14 drives the piezoelectric elements 12 with the predetermined drive signals and vibrates the touch face 11a. Thereby, the click sensation is provided to the operator by stimulating the touch sense of the operator such that the operator recognizes that the input operation is completed. Accordingly, even if the button switch such as the push-button switch (push-type button switch) is graphically depicted on the touch sensor, the operator inputs to the touch sensor 11 feeling the realistic click sensation similar to that obtained when operating the push-button switch. Thus, the operator may not have the feeling of strangeness. Moreover, since the operator carries out the input operation in conjunction with perception to "have pressed" the touch sensor 11, erroneous input caused by mere tapping is prevented.

In addition, when the standard of the pressure load to provide the tactile sensation is set higher than the load at which the touch sensor 11 responds to the touch input (setting the timing to provide the tactile sensation later than the timing of response to the touch input by the touch sensor 11), the control unit 14 determines an input position according to a touch operation to the touch face 11a and changes the display state of the input object at a corresponding portion on the display unit 13. Then, when the pressure load on the touch face 11a detected based on the output of the piezoelectric elements 12 satisfies the standard to provide the tactile sensation, the control unit 14 drives the piezoelectric elements 12 to provide the tactile sensation and also execute a predetermined operation (for example, execution and processing of a program corresponding to the object) by confirming the input position. In this case, the operator confirms that the input object is selected, by seeing a change of the display state of the input object displayed on the display unit 13. Moreover, since the click sensation is provided to the operator upon pressing the touch face 11a, the operator recognizes that the input object selected is determined (executed). Thereby, it is possible to prevent erroneous inputs by a so-called wandering finger.

In providing the click sensation of the push-button switch as described above, the control unit 14, after switching the three piezoelectric elements 12 back in the load detection mode at step S307, switches them in the tactile sensation providing mode when the pressure load fails to satisfy the standard in releasing as well. Then, the control unit 14 drives the three piezoelectric elements 12 with the drive signals, the same as those in pressing, such that the click sensation described above (a release sensation, at this time) is provided. Thereby, it is possible to provide a more realistic click sensation bringing the sensation "Cli" in pressing and a sensation "Ck" in releasing. It is to be appreciated that the drive signals for the release sensation do not need to be the same as those for the click sensation.

Here, although the standard of the load to provide the release sensation may be set to be the same as the standard to provide the click sensation set forth above, it is preferable to set the standard of the load to provide the release sensation to be 50-80% lower than that to provide the click sensation in pressing. Thereby, timings to provide the tactile sensation are synchronized with timings of sequential inputs when the same position (input object) is continuously input (tapped), providing the realistic click sensation without the feeling of strangeness. That is, setting the standard of the load to provide the tactile sensation in releasing to be smaller than that to provide the tactile sensation in pressing enables to prevent the feeling of strangeness. In addition, setting the standard of the load to provide the tactile sensation in releasing to be approximately 50% or more of that to provide the tactile sensation in pressing contributes to a significant improvement in operability in the continuous input. Moreover, setting the standard of the load to provide the tactile sensation in releasing to be approximately 80% or less of that to provide the tactile sensation in pressing enables to deal with a faint load change in a holding state in the continuous input.

In addition, the piezoelectric elements 12 provide not only the click sensation but also a variety of tactile sensations by changing the drive signal. For example, in order to provide a soft tactile sensation perceived as a "throbbing" sensation and a "jelly-like" sensation, the drive signal, for example, a sine wave with a frequency of approximately 200 Hz to 500 Hz, for two or three periods is applied. Alternatively, in order to provide a "vibrating" sensation, the drive signal, for example, a sine wave with a frequency of approximately 200 Hz to 500 Hz, for four or more periods is applied. Preferably, information on the drive signals to provide those various tactile sensations is stored in a memory unit (not illustrated) such that the user arbitrarily set the drive signal to provide a desired tactile sensation. The tactile sensations "Cli", "Ck", "Click", the "throbbing" sensation, the "jelly-like" sensation and the "vibrating" sensation set forth in the present specification are sensations obtained by the operator described in Japanese. Examples of drive signals to provide actual tactile sensations are set forth above.

According to the input apparatus of the present embodiment, since the piezoelectric element 12 is used for a plurality of functions as a load sensor to detect the pressure load on the touch face 11a of the touch sensor 11 and as an actuator to vibrate the touch face 11a, the number of components and cost are reduced. In addition, reduction of the number of components saves space for the components, which leads to downsizing of the apparatus.

It is to be understood that the present invention is not limited to the embodiment set forth above and various modifications and changes may be implemented. For example, it is possible to provide any number of the piezoelectric elements 12 instead of three. In addition, the piezoelectric element may have a known configuration such as monomorph, unimorph, bimorph and a laminated type, based on a size, vibration amplitude and the like of the touch sensor 11.

The present invention is effectively applicable to an input apparatus in which the touch sensor serves as a touch switch for on/off operations. Also, the input apparatus according to the present invention is capable of providing feelings of a multistep switch, such as a two-step switch (pressed further after pressed), by sequentially providing the click sensation on different standards (loads) while the touch sensor is being pressed. Thereby, if the input apparatus is applied to a release button of a camera, for example, a feeling of lock focus (first step) and a feeling of release (second step) are provided. In addition, in combination with the display unit, the input apparatus changes a display of a menu screen and the like in a variety of manners in accordance with the steps of pressing. Moreover, when providing the feelings of the multistep switch, it is possible to change the drive signal to vibrate the touch face at each step in order to provide a different click sensation at each step.

According to the present invention, the input apparatus drives the piezoelectric element when the pressure load detected based on the output of the piezoelectric element satisfies a standard to provide the tactile sensation. Here, "when the pressure load detected based on the output of the piezoelectric element satisfies the standard to provide the tactile sensation" may include either "when the pressure load detected reaches a standard value to provide the tactile sensation", "when the pressure load detected exceeds the standard value to provide the tactile sensation", or "when the standard value to provide the tactile sensation is detected based on the output of the piezoelectric element".

REFERENCE SIGNS LIST 11 touch sensor
11a touch face
12 piezoelectric element
13 display unit
14 control unit
21 housing
22 insulator
23 upper cover
24 insulator

The invention claimed is:

1. An input apparatus comprising:
    a touch sensor configured to detect a touch input, the touch sensor disposed on the input apparatus via a plurality of supports and the touch sensor configured to bend in response to the touch input;
    piezoelectric elements directly mounted on the touch sensor at a respective spaced distance from each one of the plurality of supports, each of the piezoelectric elements having one end mounted on the touch sensor and the other end opened, the piezoelectric elements are disposed at two sides opposite to each other and at least one side orthogonal to the two sides in a peripheral region on the touch sensor and the piezoelectric elements are not supported from inside of the housing; and
    a control unit configured to detect a pressure load on a touch face of the touch sensor based on an output signal of the piezoelectric elements caused by the bending of the piezoelectric elements in response to the touch input on the touch face and, when the pressure load detected satisfies a standard to provide a tactile sensation, to drive the piezoelectric elements such that the tactile sensation is provided to an object pressing the touch face.

2. A control method of an input apparatus including
    a touch sensor configured to detect a touch input, the touch sensor disposed on the input apparatus via a plurality of supports and the touch sensor configured to bend in response to the touch input; and
    piezoelectric elements directly mounted on the touch sensor at a respective spaced distance from each one of the plurality of supports, the piezoelectric elements having one end mounted on the touch sensor and the other end opened, the piezoelectric elements are disposed at two sides opposite to each other and at least one side orthogonal to the two sides in a peripheral region on the touch sensor and the piezoelectric elements are not supported from inside of the housing, comprising the step of:

detecting a pressure load on a touch face of the touch sensor based on an output signal of the piezoelectric elements caused by the bending of the piezoelectric elements in response to the touch input on the touch face and, when the pressure load detected satisfies a standard to provide a tactile sensation, driving the piezoelectric elements such that the tactile sensation is provided to an object pressing the touch face.

3. The input apparatus according to claim 1, wherein the standard to provide a tactile sensation includes a first standard and a second standard.

4. The input apparatus according to claim 3,
wherein the control unit is configured to drive the piezoelectric elements such that the tactile sensation is provided to an object pressing the touch face when the pressure load detected is equal to or higher than the first standard, and
wherein the control unit is configured to drive the piezoelectric elements such that the tactile sensation is provided to an object pressing the touch face when the pressure load detected is lower than the second standard.

5. The input apparatus according to claim 3, wherein the first standard is higher than the second standard.

6. The input apparatus according to claim 5, wherein the second standard is 50-80% lower than the first standard.

7. The input apparatus according to claim 4, wherein the first standard is higher than the second standard.

8. The input apparatus according to claim 7, wherein the second standard is 50-80% lower than the first standard.

9. An input apparatus comprising:
a touch sensor configured to detect a touch input and a position of the touch input, the touch sensor disposed on the input apparatus via a plurality of supports and the touch sensor configured to bend in response to the touch input;
a piezoelectric element mounted on the touch sensor at a respective spaced distance from each one of the plurality of supports, the piezoelectric element having one end mounted on the touch sensor and the other end opened; and
a control unit configured to detect a pressure load on a touch face of the touch sensor based on an output signal of the piezoelectric element caused by the bending of the piezoelectric element in response to the touch input on the touch face and, when the pressure load detected satisfies a first standard to provide a tactile sensation, to drive the piezoelectric element such that the tactile sensation is provided to an object pressing the touch face, wherein
the first standard is higher than a second standard to react to the touch input.

10. An input apparatus comprising:
a touch sensor configured to detect a touch input, the touch sensor disposed on the input apparatus via a plurality of supports and the touch sensor configured to bend in response to the touch input;
a piezoelectric element mounted on the touch sensor at a respective spaced distance from each one of the plurality of supports, the piezoelectric element having one end mounted on the touch sensor and the other end opened; and
a control unit configured to detect a pressure load on a touch face of the touch sensor based on an output signal of the piezoelectric element caused by the bending of the piezoelectric element in response to the touch input on the touch face and, when the pressure load detected satisfies a standard to provide a tactile sensation, to drive the piezoelectric element such that the tactile sensation is provided to an object pressing the touch face, and the tactile sensation provided to the object includes a press tactile sensation provided when a press standard is satisfied and a release tactile sensation provided when a release standard is satisfied,
wherein the press standard is higher than the release standard.

11. A control method of an input apparatus including
a touch sensor configured to detect a touch input and a position of the touch input, the touch sensor disposed on the input apparatus via a plurality of supports and the touch sensor configured to bend in response to the touch input;
a piezoelectric element mounted on the touch sensor at a respective spaced distance from each one of the plurality of supports, the piezoelectric element having one end mounted on the touch sensor and the other end opened, comprising the step of:
detecting a pressure load on a touch face of the touch sensor based on an output signal of the piezoelectric element caused by the bending of the piezoelectric element in response to the touch input on the touch face and, when the pressure load detected satisfies a first standard to provide a tactile sensation, driving the piezoelectric element such that the tactile sensation is provided to an object pressing the touch face,
wherein the first standard is higher than a second standard to react to the touch input.

12. A control method of an input apparatus including
a touch sensor configured to detect a touch input, the touch sensor disposed on the input apparatus via a plurality of supports and the touch sensor configured to bend in response to the touch input; and
a piezoelectric element mounted on the touch sensor at a respective spaced distance from each one of the plurality of supports, the piezoelectric element having one end mounted on the touch sensor and the other end opened, comprising the step of:
detecting a pressure load on a touch face of the touch sensor based on an output signal of the piezoelectric element caused by the bending of the piezoelectric element in response to the touch input on the touch face and, when the pressure load detected satisfies a standard to provide a tactile sensation, driving the piezoelectric element such that the tactile sensation is provided to an object pressing the touch face, and the tactile sensation provided to the object includes a press tactile sensation provided when a press standard is satisfied and a release tactile sensation provided when a release standard is satisfied,
wherein the press standard is higher than the release standard.

* * * * *